(12) United States Patent
Ikeda

(10) Patent No.: US 10,409,207 B2
(45) Date of Patent: Sep. 10, 2019

(54) TRANSMISSION CONTROL APPARATUS AND IMAGE FORMING APPARATUS WITH TRANSMISSION CONTROL APPARATUS

(71) Applicant: Naoto Ikeda, Kanagawa (JP)

(72) Inventor: Naoto Ikeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 172 days.

(21) Appl. No.: 15/441,388

(22) Filed: Feb. 24, 2017

(65) Prior Publication Data
US 2017/0261901 A1 Sep. 14, 2017

(30) Foreign Application Priority Data

Mar. 10, 2016 (JP) ................................. 2016-047459

(51) Int. Cl.
*G06F 1/32* (2019.01)
*G03G 15/00* (2006.01)
*G06F 1/3203* (2019.01)

(52) U.S. Cl.
CPC ......... *G03G 15/5004* (2013.01); *G03G 15/80* (2013.01); *G06F 1/3203* (2013.01)

(58) Field of Classification Search
CPC ........................... G03G 15/5004; G03G 15/80
USPC ....................................................... 713/300
See application file for complete search history.

(56) References Cited

U.S. PATENT DOCUMENTS

| | | | | |
|---|---|---|---|---|
| 6,321,341 B1* | 11/2001 | Kamijo | ..................... | G06F 1/28 365/227 |
| 7,317,931 B2* | 1/2008 | Guo | ..................... | H04W 52/267 455/39 |
| 7,958,383 B2* | 6/2011 | Chung | ................. | G06F 1/3203 713/501 |
| 8,433,932 B2* | 4/2013 | Nakazawa | ................ | G06F 1/30 702/79 |
| 2002/0097423 A1* | 7/2002 | Qiao | ..................... | G06K 15/00 358/1.14 |
| 2003/0041272 A1* | 2/2003 | Nguyen | ..................... | G06F 1/26 713/300 |
| 2003/0091882 A1* | 5/2003 | Schmidt | ............. | H01M 8/0432 429/430 |

(Continued)

FOREIGN PATENT DOCUMENTS

| | | |
|---|---|---|
| JP | H08-023582 | 1/1996 |
| JP | 2009-298009 | 12/2009 |

*Primary Examiner* — Volvick Derose
(74) *Attorney, Agent, or Firm* — IPUSA, PLLC

(57) ABSTRACT

A transmission control apparatus includes a first control board including a first control unit with an input/output port and a first board connector; and a second control board including a second control unit with an input/output port and a second board connector. The first control board is connected to the second control board via a general purpose cable, the general purpose cable is used for transmission of an indication signal as a digital signal controlling a power-supply mode transition and is used for serial communications. Lengths of change periods, during which a logical value of the indication signal is changed and with which transitions among three or more power-supply modes are associated, are preset and stored in the first control unit and the second control unit, respectively. The power-supply mode is transitioned to a specific mode according to the lengths of the change periods of the indication signal.

10 Claims, 16 Drawing Sheets

(56) References Cited

U.S. PATENT DOCUMENTS

| | | | |
|---|---|---|---|
| 2006/0015312 A1* | 1/2006 | Tsukamoto | G06F 17/5022 703/14 |
| 2006/0265614 A1* | 11/2006 | Nguyen | G06F 1/26 713/300 |
| 2008/0091990 A1* | 4/2008 | Bruce | G11C 5/147 714/721 |
| 2008/0109663 A1* | 5/2008 | Snyder | B41J 29/393 713/300 |
| 2008/0215765 A1* | 9/2008 | Butler | G06F 1/3203 710/15 |
| 2010/0205328 A1* | 8/2010 | Howard | G06F 1/3203 710/18 |
| 2010/0295606 A1* | 11/2010 | Tsuchiya | G06F 17/5045 327/534 |
| 2011/0076038 A1* | 3/2011 | Nakaminato | G03G 15/5004 399/37 |
| 2011/0088067 A1* | 4/2011 | Azuma | H04N 5/4403 725/58 |
| 2011/0093727 A1* | 4/2011 | Hwang | G06F 1/266 713/320 |
| 2011/0138200 A1* | 6/2011 | Tomizawa | G06F 1/266 713/310 |
| 2012/0173903 A1* | 7/2012 | Huffman | G06F 1/3203 713/320 |
| 2012/0221876 A1* | 8/2012 | Chen | G06F 1/3296 713/323 |
| 2012/0300250 A1* | 11/2012 | Ono | G03G 15/5004 358/1.15 |
| 2013/0009932 A1* | 1/2013 | Choi | G09G 5/003 345/211 |
| 2013/0031394 A1* | 1/2013 | Hayashi | G06F 1/3209 713/323 |
| 2013/0054954 A1* | 2/2013 | Lee | H04N 21/42204 713/2 |
| 2013/0163015 A1* | 6/2013 | Sasaki | G03G 15/50 358/1.13 |
| 2014/0254369 A1* | 9/2014 | Kulkarni | H04L 12/12 370/235 |
| 2014/0359176 A1* | 12/2014 | Kim | G06F 13/32 710/59 |
| 2015/0023101 A1* | 1/2015 | Tanaka | G11C 16/30 365/185.11 |
| 2016/0320823 A1* | 11/2016 | Gerber | G06F 13/385 |
| 2017/0126039 A1* | 5/2017 | Nguyen | H02J 7/0052 |
| 2017/0139467 A1* | 5/2017 | Waters | G06F 1/3287 |

* cited by examiner

PIN NUMBER. SIGNAL NAME
1. VBUS (+5V)
2. SIGNAL (D-)
3. SIGNAL (D+)
4. USB ON-THE-GO ID
5. GND

PIN 1    PIN 5

PIN NUMBER. SIGNAL NAME
1. VBUS (+5V)
2. SIGNAL (D-)
3. SIGNAL (D+)
4. USB ON-THE-GO ID
5. GND
6. USB 3.0 SEND (-)
7. USB 3.0 SEND (+)
8. GND
9. USB 3.0 RECEIVE (-)
10. USB 3.0 RECEIVE (+)

FIG.6

| OPERATION PANEL FUNCTION | STANDBY MODE | ENERGY SAVING MODE | AC PLUG IN MODE |
|---|---|---|---|
| LCD DISPLAY | AVAILABLE | NOT AVAILABLE | NOT AVAILABLE |
| LED LIGHTING/FLASHING | AVAILABLE | PARTIALLY AVAILABLE | NOT AVAILABLE |
| USER I/F COMMUNICATION INCLUDING USB | AVAILABLE | NOT AVAILABLE | NOT AVAILABLE |
| COMMUNICATION BETWEEN MAIN BODY AND OPERATION UNIT | AVAILABLE | NOT AVAILABLE | NOT AVAILABLE |
| TOUCH PANEL INPUT | AVAILABLE | AVAILABLE | NOT AVAILABLE |
| KEY INPUT | AVAILABLE | AVAILABLE | NOT AVAILABLE |

POWER: LARGE ⇔ POWER: SMALL

FIG.7B

| No. | POWER SUPPLY MODE TRANSITION | SIGNAL LOGIC DETERMINATION PERIOD | SIGNAL LOGIC SCHEMATIC DIAGRAM |
|---|---|---|---|
| [1] | FORCED SHUTDOWN | EQUAL TO OR MORE THAN 500 ms | 500 ms, LESS THAN 10 ms, FORCED SHUTDOWN |
| [2] | START-UP SEQUENCE 1 | EQUAL TO OR MORE THAN 50 ms | |
| [3] | START-UP SEQUENCE 2 | EQUAL TO OR MORE THAN 50 ms | 50 ms, LESS THAN 10 ms, START-UP SEQUENCE |
| [4] | START-UP SEQUENCE 3 | EQUAL TO OR MORE THAN 50 ms | |
| [5] | ENERGY SAVING TRANSITION | EQUAL TO OR MORE THAN 200 ms | 200 ms, LESS THAN 10 ms, ENERGY SAVING TRANSITION |

TRANSMISSION CONTROL APPARATUS AND IMAGE FORMING APPARATUS WITH TRANSMISSION CONTROL APPARATUS

BACKGROUND OF THE INVENTION

1. Field of the Invention

The present invention relates to a transmission control apparatus and an image forming apparatus with the transmission control apparatus.

2. Description of the Related Art

In general, as illustrated in FIG. 14, it is necessary for an image forming apparatus to have two cables. One is a serial communication cable such as a USB cable and used for serial communications between a first control unit and a second control unit in an operation panel. The other is a cable for an indication signal indicating a power supply mode from the first control unit.

However, in order to have two cables, it is necessary to have two sets of cable connectors and cables, which leads to increased cost and prevents from making smaller the apparatus.

Therefore, PLT 1 describes a technique in which it is possible for a plurality of control units/control boards to communicate with each other by using an asynchronous serial communication port capable of bidirectional serial communications and by allowing apparatuses to pulse-drive during the time widths predefined for the respective apparatuses.

CITATION LIST

Patent Literature

[PLT 1]
Japanese Unexamined Patent Application Publication No. H08-023582

SUMMARY OF THE INVENTION

According to an aspect of the present invention, a transmission control apparatus is provided. The transmission control apparatus includes a first control board including a first control unit with an input/output port and a first board connector; and a second control board including a second control unit with an input/output port and a second board connector. The first control board is connected to the second control board via a general purpose cable, and the general purpose cable is used for transmission of an indication signal as a digital signal controlling a power supply mode transition and is used for serial communications. Lengths of change periods, during which a logical value of the indication signal is changed and with which transitions among three or more power supply modes are associated, are preset and stored in the first control unit and the second control unit, respectively. The power supply mode is transitioned to a specific mode according to the lengths of the change periods of the indication signal.

BRIEF DESCRIPTION OF THE DRAWINGS

FIG. 6 is a table illustrating power supply modes operated by the image forming apparatus.

FIG. 7B is a drawing illustrating settings of signal logic determination periods of the power supply modes.

DETAILED DESCRIPTION OF THE PREFERRED EMBODIMENTS

It is an object of the present invention to provide a signal transmission apparatus that controls an indication signal used for controlling a power supply mode transition and a signal for serial communications between a plurality of boards by using a single general purpose cable without interfering with the serial communications.

According to an aspect of the present invention, it is possible for the signal transmission apparatus to control an indication signal used for controlling a power supply mode transition and a signal for serial communications between a plurality of boards by using a single general purpose cable without interfering with the serial communications.

In the following, embodiments of the present invention will be described referring to the accompanied drawings. It should be noted that in the specification and the drawings, elements which include substantially the same functional structure are given the same numerals, and duplicated descriptions will be omitted.

<Transmission Control Apparatus>

Figure 1:
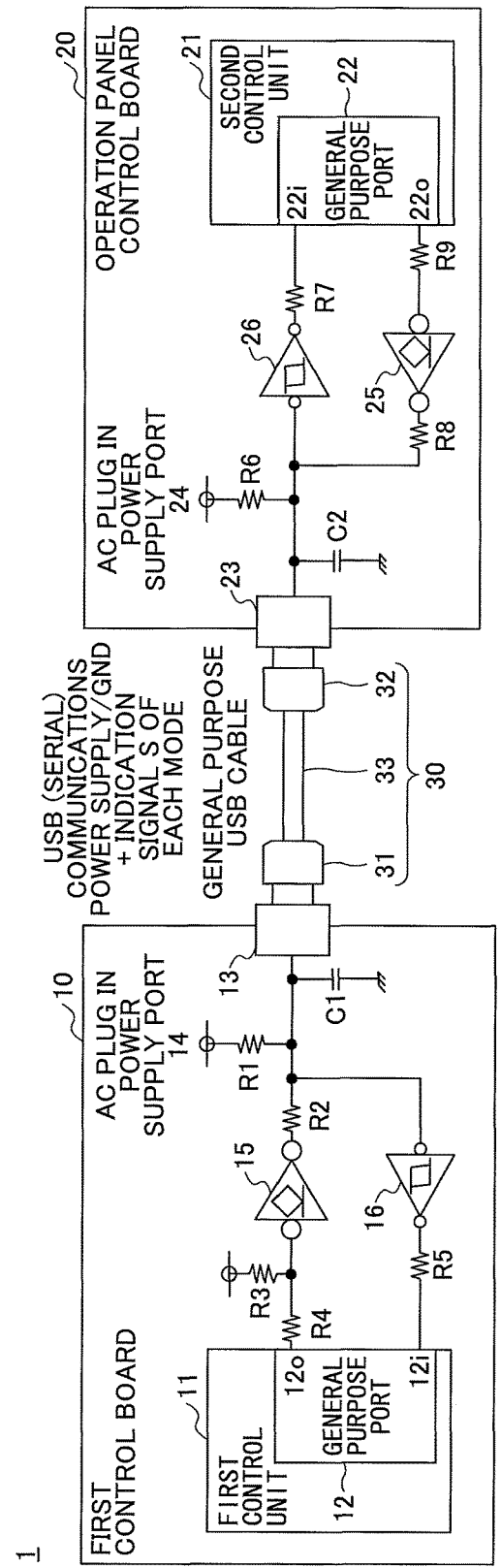
FIG. 1 is a drawing illustrating an overall configuration of a transmission control apparatus according to an embodiment of the present invention.

FIG. 1 is a drawing illustrating an overall configuration of a transmission control apparatus 1 according to an embodiment of the present invention. As illustrated in the figure, the transmission control apparatus 1 includes a first control board 10 and a second control board 20, and the first control board 10 is connected to the second control board 20 via a cable 30.

The first control board 10 includes a first control unit 11 and a board connector (a first board connector) 13. The second control board 20 includes a second control unit 21 and a board connector (a second board connector) 23.

Further, the control boards 10 and 20 includes AC plug-in power supply terminals 14 and 24, respectively.

Further, the first control board 10 includes as circuit elements an open collector buffer 15, a Schmitt trigger buffer 16, resistors R1 to R5, and a capacitor C1. The second control board 20 includes as circuit elements an open collector buffer 25, a Schmitt trigger buffer 26, resistors R6 to R9, and a capacitor C2. It should be noted that the circuit elements are not limited to the above.

Signals output from the first control unit 11 and the second control unit 21 go through wirings on the side of open collector buffers 15 and 25, and are output from the first control unit 11 and the second control unit 21 via board connectors 13 and 23, respectively. The open collector buffers 15 and 25 output signals by using signals from the first control unit 11 and the second control unit 21 as switching signals, respectively.

The signals (indication signals), which are input from the board connectors 13 and 23 to the first control board 10 and the second control board 20, go through the wirings on the side of the Schmitt trigger buffers 16 and 26, and are input to the first control unit 11 and the second control unit 21, respectively. The Schmitt trigger buffers 16 and 26 are used for removing noise from the input indication signals and for waveform shaping.

In the first control board 10, the first control unit 11 is a well-known central processing unit. In the case where the transmission control apparatus 1 is mounted on an apparatus, the first control board 10 is, for example, a main body control board.

Further, the first control unit 11 includes a general purpose port 12 including an input terminal 12*i* and an output terminal 12*o*. The general purpose port 12 is a group of ports that are mounted on the well-known central processing unit and used for detecting/controlling input and output signals.

Further, in the first control board 10, the board connector 13 is, for example, a well-known USB connector for board mounting or a surface mount USB connector. The board connector (host side connector, port) 13 is connected to the cable 30.

The indication signals used for controlling the power supply mode transition are connected to the input/output port 12 including the input terminal 12*i* and the output terminal 12*o* of the first control unit 11 via the board connector 13 of the first control board 10.

In the second control board 20, the second control unit 21 is a well-known central processing unit. In the case where the transmission control apparatus 1 is mounted on an apparatus, the second control board 20 is, for example, an operation panel control board.

Further, the second control unit 21 includes a general purpose port 22 including an input terminal 22*i* and an output terminal 22*o*. The general purpose port 22 is a group of ports that are mounted on the well-known central processing unit and used for detecting/controlling input and output signals.

The indication signals used for controlling the power supply mode transition are connected to the input/output port 22 including the input terminal 22*i* and the output terminal 22*o* of the second control unit 21 via the board connector 23 of the second control board 20.

Further, in the second control board 20, the board connector 23 is, for example, a well-known USB connector for board mounting or a surface mount USB connector. The board connector 23 is connected to the cable (USB cable) 30.

The cable 30 is a general purpose cable and is a well-known USB cable. The cable 30 connects the first control board 10 and the second control board 20, and are connected to the board connector 13 of the first control board 10 and the board connector 23 of the second control board 20.

In an embodiment, the general purpose cable 30 is used for transmission of an indication signal S that controls the power supply mode transition and is also used for USB serial communications.

<Connection Plug Terminal>

The general purpose cable 30 includes a first connection plug 31, a second connection plug 32, and a transmission line 33.

The general purpose cable (USB cable) 30 used in an embodiment is a USB 2.0 standard Mini-B type, a Micro-B type, or a USB 3.0 standard Mini-B type, and preferably includes at least five terminals, and further includes an ID terminal used for identification in a connection plug.

Figure 2:
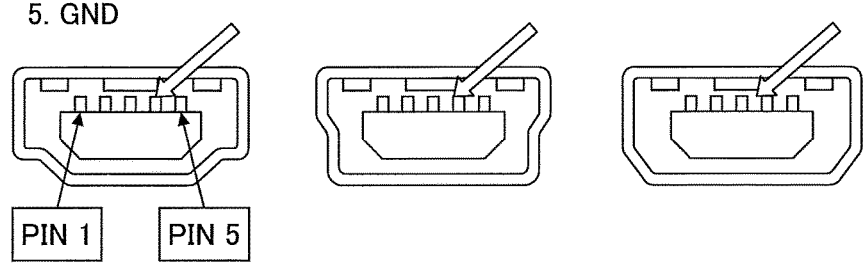
FIG. 2 is a drawing illustrating an example of pins of a USB plug used for a cable according to USB 2.0 standard Mini-B type.
Figure 3:
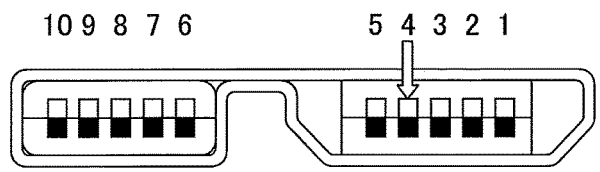
FIG. 3 is a drawing illustrating an example of pins of a USB plug used for a cable according to USB 3.0 standard Mini-B type.

FIG. 2 illustrates an example of pins of a USB plug used for the cable 30 of the USB 2.0 standard Mini-B type. FIG. 3 illustrates an example of pins of a USB plug used for the cable 30 of the USB 3.0 standard Mini-B type.

In FIG. 2, roles of the pins (pin assignment) of the USB 2.0 standard Mini-B type plug are illustrated. The roles of terminals (pins) are the same even if the outline shapes are different as long as the types are the same. A USB 2.0 standard Mini-A type also has five terminals of the same roles.

It should be noted that the USB 2.0 standard Micro-type plug is different from the Mini-B type plug and the Mini-A type plug in that the size is a little smaller and that a stopper is included. However, the roles of the pins (pin assignment) of the USB 2.0 standard Micro-type plug are the same as illustrated in FIG. 2.

In FIG. 3, roles of the pins (pin assignment) of the USB 3.0 standard Mini-B type plug are illustrated. It should be noted that, in USB 3.0 standard, an A type plug of a standard specification also has five terminals.

As described above, a pin 4 (ID terminal 4) of the USB 2.0 standard or the USB 3.0 standard is used for ID-identification of a machine (cable) by a USB host. It is not necessary for the pin 4 (ID terminal 4) to be used for communications in the machine. Therefore, in general, the pin 4 (ID terminal 4) is a free port. It should be noted that "On-The-Go" means direct communications between devices via USB.

In view of the above, in the cable 30 according to an embodiment, the ID terminal 4 of the typical USB cable plug, which is in general a free port, is used for a bidirectional signal indicating the power supply mode transition of the control boards. An indication signal S, which is a digital signal transmitted via the ID terminal 4 of the general purpose cable 30, is transmitted to the input/output ports (general purpose ports) 12 and 22 of the control units 11 and 21, and the controlling of the power supply modes is performed between the control units 11 and 21.

As a result, regardless of the states of the control units 11 and 21, or during the power supply mode transition, the serial communications can be performed.

It should be noted that, in the connecting method of the USB cable, it is defined that an A terminal is a host side terminal and a B terminal is a device side terminal. Therefore, the first connection plug 31 of Mini-A type, Micro-A type, or USB 3.1 standard A type (Gen1) or C type (Gen2) is connected to the first control board 10 that will be a host side when mounted on the apparatus.

Further, the second connection plug 32 of Mini-B type, or USB 3.1 standard C type (Gen1, Gen2) is connected to the second control board 20 that will be a device side.

<Image Forming Apparatus>

Figure 4:
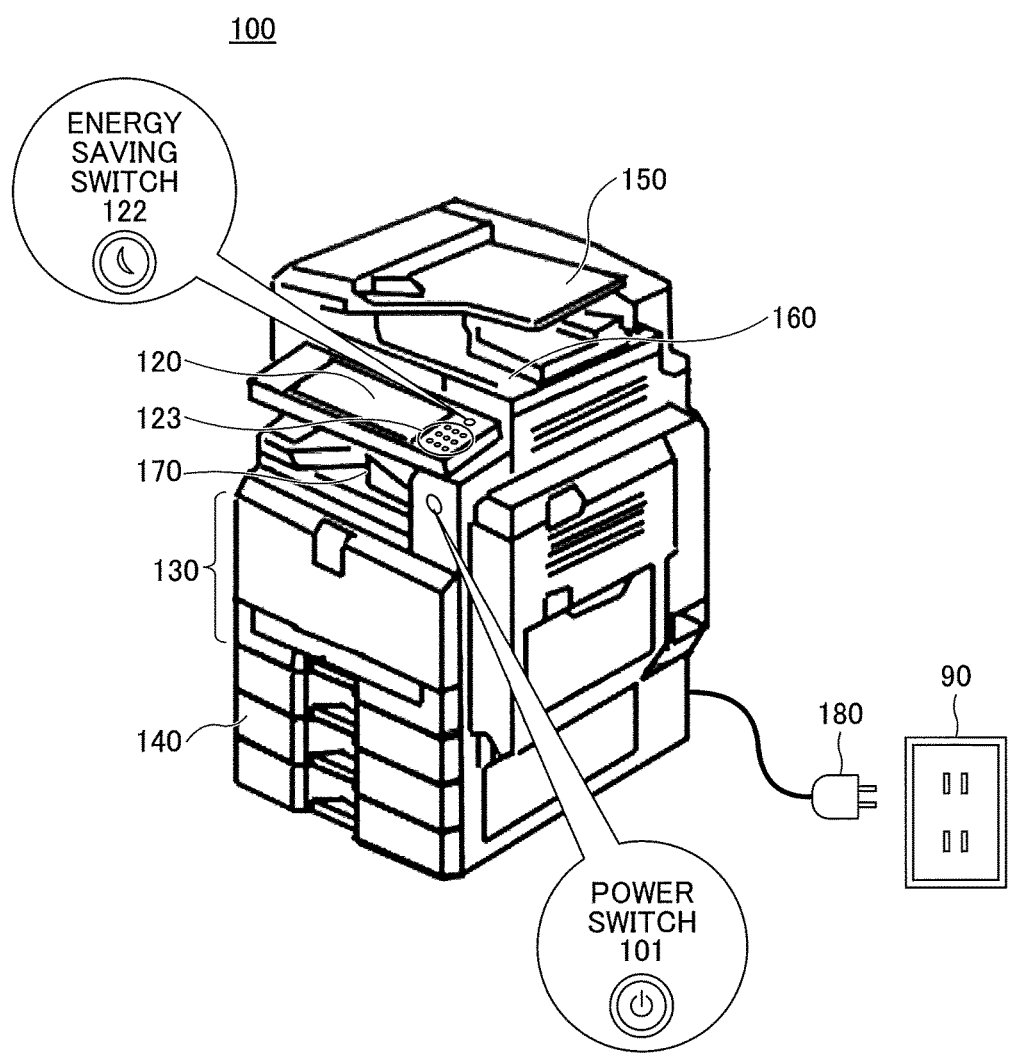
FIG. 4 is a drawing illustrating an example of an image forming apparatus on which the transmission control apparatus according to an embodiment is mounted.

FIG. 4 is an exterior perspective view of a typical image forming apparatus 100. As illustrated in the figure, the image forming apparatus 100 includes a printer unit 130, an operation panel 120, a paper tray 140, an Automatic Document Feeder (ADF) 150, a scanner 160, and a paper ejection tray 170.

Further, a power switch (main power switch) 101 is disposed on an outer surface of an enclosure of the image forming apparatus 100 excluding the operation panel 120. A shape of the power switch 101 is not limited to a press type as illustrated in the figure, and may be a snap type or other types.

Further, the image forming apparatus 100 includes a power line (AC plug, power supply line) 180 for connecting to a commercial power supply 90.

The operation panel 120 is used by a user for operating the image forming apparatus 100. The operation panel 120 includes an energy saving switch (button) 122, other keys 123, etc. The second control board 20 is included in the image forming apparatus 100, which board corresponds to the operation panel 120.

The paper tray 140 holds paper used for copying. The ADF 150, which is located upward in the figure, feeds documents to the scanner 160. The scanner 160 reads the documents to be copied.

The printer unit 130 outputs a read document image or an image input from outside onto paper conveyed from the paper tray 140. The first control board 10 as a main control unit is included inside the printer unit 130. The paper onto which the image is output (copied) is ejected to the paper ejection tray 170.

The image forming apparatus 100 includes multiple functions as illustrated in the figure. Therefore, there are multiple control boards in the image forming apparatus 100. The main control unit (first control board 10) controls all of the functions in a unified manner.

In an embodiment, as an example, communications (bidirectional transmissions) between the second control board 20 corresponding to the operation panel 120 and the first control board 10 (main control unit) of the control boards will be described.

Figure 5:
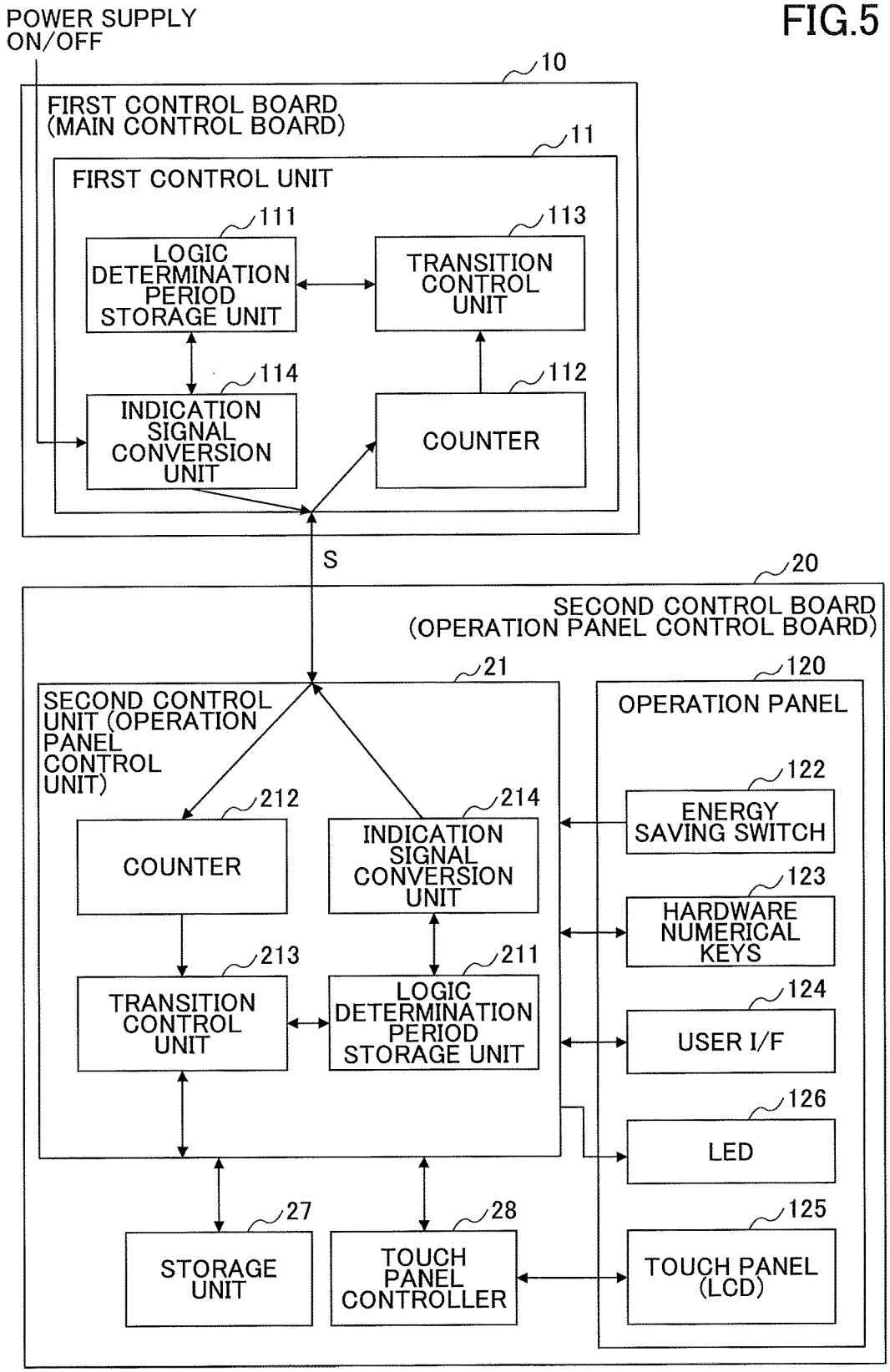
FIG. 5 is a drawing illustrating a specific example of the transmission control apparatus in the image forming apparatus of FIG. 4.

FIG. 5 illustrates a specific example of the transmission control apparatus 1 in the image forming apparatus 100 of FIG. 4. The above-described first control board 10 functions as the main control board, and the second control board 20 functions as an operation panel control board.

As illustrated in FIG. 5, the second control board 20 as the operation panel control board includes, in addition to a second control unit 21, a storage unit 27 and a touch panel controller 28. Further, the operation panel 120, which is illustrated in FIG. 4 and used for an input, is included in or connected to the second control board 20.

The operation panel 120 includes as input means the energy saving switch 122, hardware numeric keys 123, a user interface (I/F) 124 into which a USB device or the like that stores print data, etc., can be inserted, a touch panel 125, etc. Further, the operation panel 120 may include an LED 126 in order to improve decorativeness and viewability.

Typically, serial communications based on USB/I2C/SPI standard or the like are used for communications between the first control board 10 in the main body of the image forming apparatus 100 and the second control board 20 corresponding to the operation panel 120.

The first control unit 11 includes a signal logic determination period storage unit 111, a counter 112, a transition control unit 113, and an indication signal converting unit 114 as functions for the power supply mode transition. The second control unit 21 includes a signal logic determination period storage unit 211, a counter 212, a transition control unit 213, and an indication signal converting unit 214 as functions for the power supply mode transition. Functions of the units will be described later while making reference to FIG. 7.

Further, in order to reduce power consumption, the image forming apparatus has a plurality of power supply modes including a standby mode in which copying and printing can be immediately performed, an energy saving mode in which power consumption of the image forming apparatus is suppressed, an AC plug-in mode in which an AC cable is inserted and minimal control units are in operation.

<Power Supply Mode>

In the image forming apparatus 100 of FIG. 4, the power supply modes to which the image forming apparatus 100 transitions are defined as follows.

A shutdown mode means a state in which the power line (AC plug) 180 connected to the image forming apparatus 100 is not inserted in the commercial power supply 90 such as a power outlet, and power is not supplied.

The AC plug-in mode (power line plug-in mode) means a state in which the power line (AC plug) 180 connected to the image forming apparatus 100 is inserted in the commercial power supply 90, the power switch 101 is turned off, and power is not supplied.

The standby mode means a state in which installed functions of the image forming apparatus 100, such as copying and printing, can be performed immediately.

The energy saving mode means a state in which power is supplied to only minimal control units, and available functions are limited so that the power consumption of the image forming apparatus 100 is reduced.

Specific control examples are shown in FIG. 6 as a correspondence table illustrating correspondences between operation panel functions and function availabilities in the power supply modes including the standby mode, the energy saving mode, and the AC plug-in mode.

<Power Supply Mode Transition>

Figure 7A:
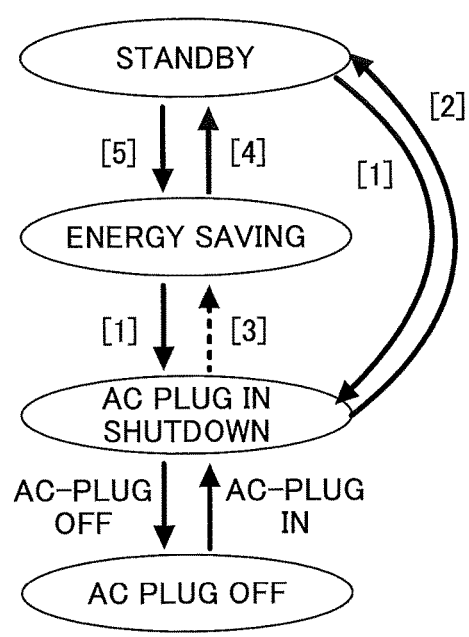
FIG. 7A is a schematic transition diagram of the power supply modes.

Transitions among the power supply modes will be described. FIG. 7A is a drawing illustrating a schematic transition diagram of the power supply modes and FIG. 7B is a drawing illustrating settings of signal logic determination periods in the power supply mode transitions.

As illustrated in FIG. 7B, an indication signal indicating the power supply mode transition is a digital signal including two logical values.

As illustrated in FIG. 7B, lengths of change periods, during which the logical value of the indication signal is changed (signal logic determination periods) and with which transitions among the (three or more) power supply modes are associated, are preset (predetermined) and stored in the control units 11 and 21. Further, transition to a specific power supply mode is performed according to the length of the change period of the indication signal.

FIG. 7B illustrates specific examples of types of the transitions among the power supply modes and the predetermined lengths of the change periods associated with the types. As illustrated in the figure, the transitions of the power supply modes are defined by combinations of the logical values (H or L) of the indication signal and the signal logic determination periods (L period lengths). It should be noted that H indicates a normal state and L indicates a changed state in FIG. 7B. However, as a digital signal included in the indication signal, H and L state assignment may be reversed and numerical signals 0 and 1 may be used.

With the above arrangement, in each of the control units of the control boards, it is possible to determine a power supply mode of the control unit according to the length of the change period of the indication signal (signal logic determination period) and to perform transition of the power supply mode.

It should be noted that any one of the transitions is performed when the length of the change period of the indication signal after the logical value of the indication signal has been changed (from H to L) is equal to or more than 50 ms. Therefore, it is possible to prevent malfunction caused by noise from outside by determining that the change period less than 10 ms after the logical value of the indication signal has been changed is noise.

Each of the control units performs the power supply mode transition when a specific period illustrated in FIG. 7B (signal logic determination period) elapses after the logical value of the indication signal has been changed. Referring to FIG. 7B, the power supply mode transitions will be described.

<Transition [1]>:

In the case where the change period after the logical value of the indication signal has been changed to L is equal to or more than 500 ms, it is assumed that the power switch is turned off, a forced shutdown is applied, and the power supply mode is caused to transition from the energy saving mode or the standby mode to the AC plug-in mode.

<Transition [2]>:

In the case where the change period after the logical value of the indication signal has been changed is equal to or more than 50 ms, the power supply mode is caused to transition from the AC plug-in mode to the standby mode.

<Transition [3]>:

In the case where the change period after the logical value of the indication signal has been changed is equal to or more than 50 ms, the power supply mode is caused to transition from the AC plug-in mode to the energy saving mode.

<Transition [4]>:

In the case where the change period after the logical value of the indication signal has been changed is equal to or more than 50 ms, the power supply mode is caused to transition from the energy saving mode to the standby mode. It should be noted that, when detecting the change period of the logical value in the transition [4], in order to avoid confusing with the transition [1] in which the power supply mode is caused to transition from the energy saving mode to the AC plug-in mode by the forced shutdown, an upper limit value (e.g., 100 ms) is also preset.

<Transition [5]>:

In the case where the change period after the logical value of the indication signal has been changed is equal to or more than 200 ms, the power supply mode is caused to transition from the standby mode to the energy saving mode. It should be noted that, when detecting the change period of the logical value in the transition [5], in order to avoid confusing with the transition [1] in which the power supply mode is caused to transition from the standby mode to the AC plug-in mode by the forced shutdown, an upper limit value (e.g., 250 ms) is also preset.

The above-described transition control is performed by the first control unit 11 and the second control unit 21 (refer to FIG. 5).

More specifically, the first control unit 11 stores in the signal logic determination period storage unit 111 the lengths of change periods, during which the logical value of the indication signal is changed (signal logic determination periods) and with which transitions among a plurality of power supply modes are associated. The counter 112 counts the length of the change period of the indication signal. The transition control unit 113 causes the image forming apparatus 100 to perform transition of the power supply mode according to the counted length of the change period by referring to the stored signal logic determination periods.

The indication signal conversion unit 114 generates an indication signal S indicating the power supply mode transition [1], [2], or [3] according to an on/off state of the power switch 101. The indication signal conversion unit 114 generates a digital signal including a predetermined length of the change period by referring to the stored signal logic determination periods.

Further, the second control unit 21 stores in the signal logic determination period storage unit 211 the lengths of change periods, during which the logical value of the indication signal is changed (signal logic determination periods) and with which transitions among the power supply modes are associated. The counter 212 counts the length of the change period of the indication signal. The transition control unit 213 performs transition of the power supply mode according to the counted length of the change period by referring to the stored signal logic determination periods.

The indication signal conversion unit 214 generates an indication signal S indicating the power supply mode transition [4], or [5] according to an on/off state of the energy saving switch 122. The indication signal conversion unit 214 generates a digital signal including a predetermined length of the change period by referring to the stored signal logic determination periods.

Figure 8A:
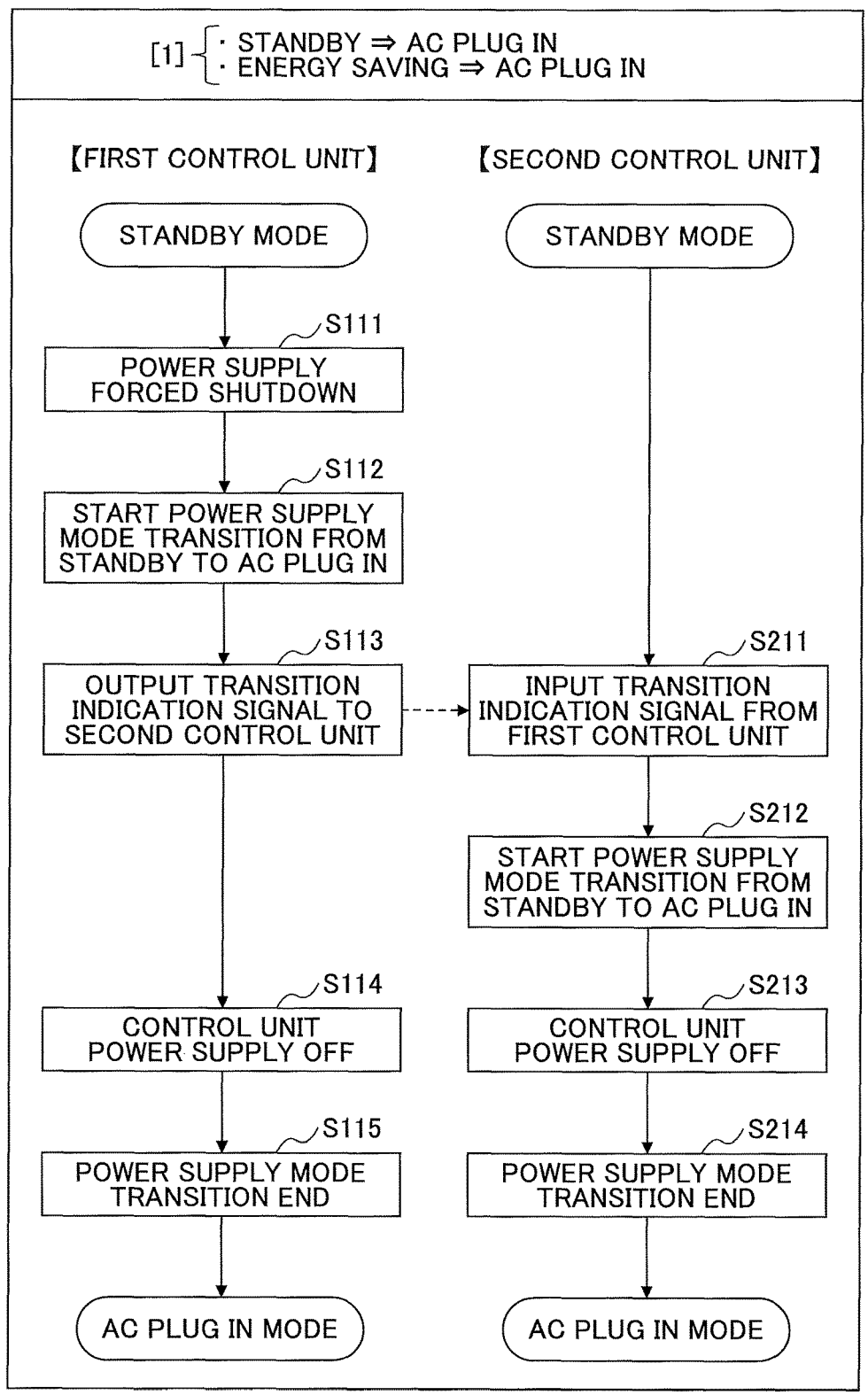
FIG. 8A and FIG. 8B are flowcharts illustrating a transition between a standby mode and an AC plug-in mode in the power supply mode transitions.
Figure 8B:
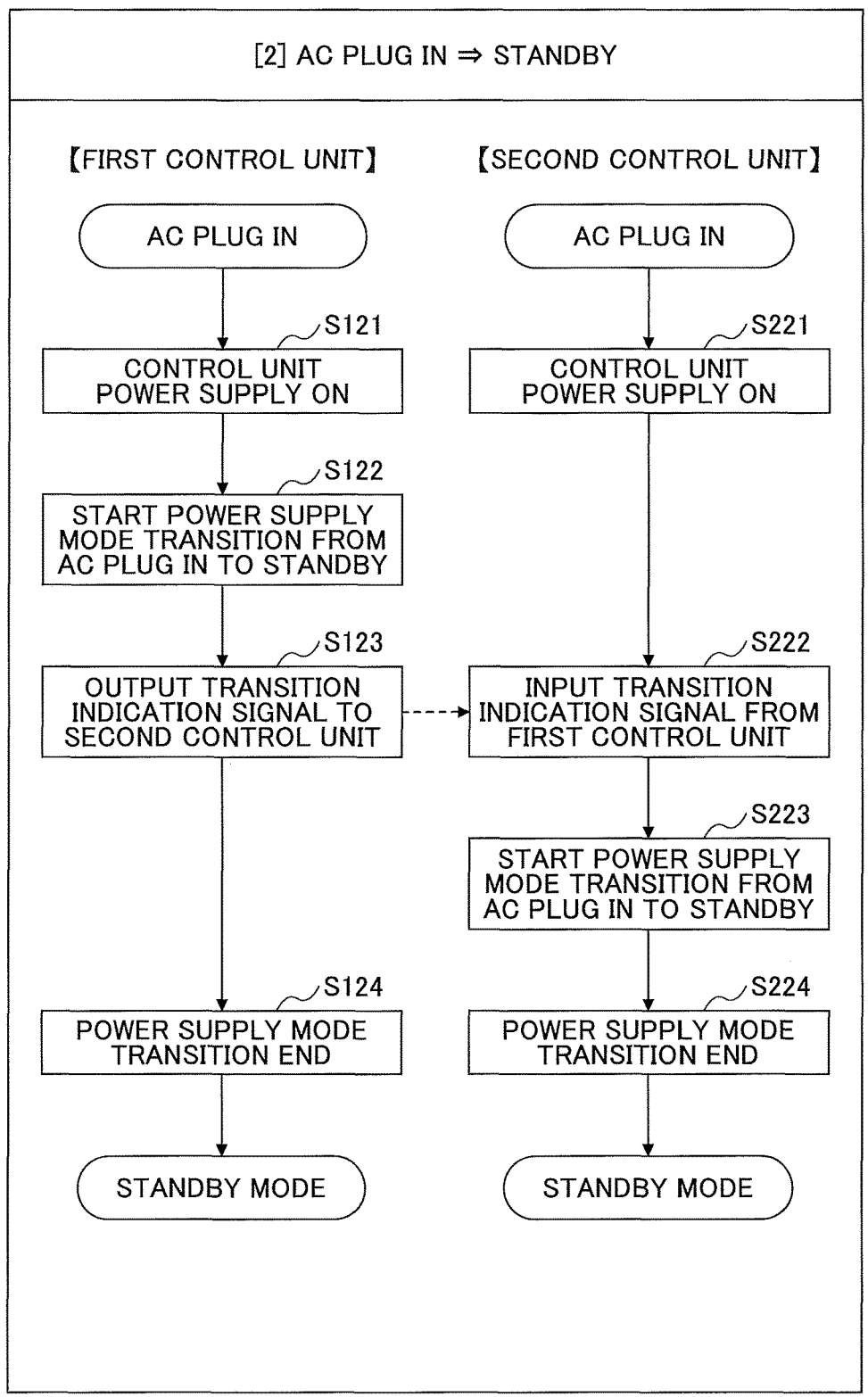
Figure 9A:
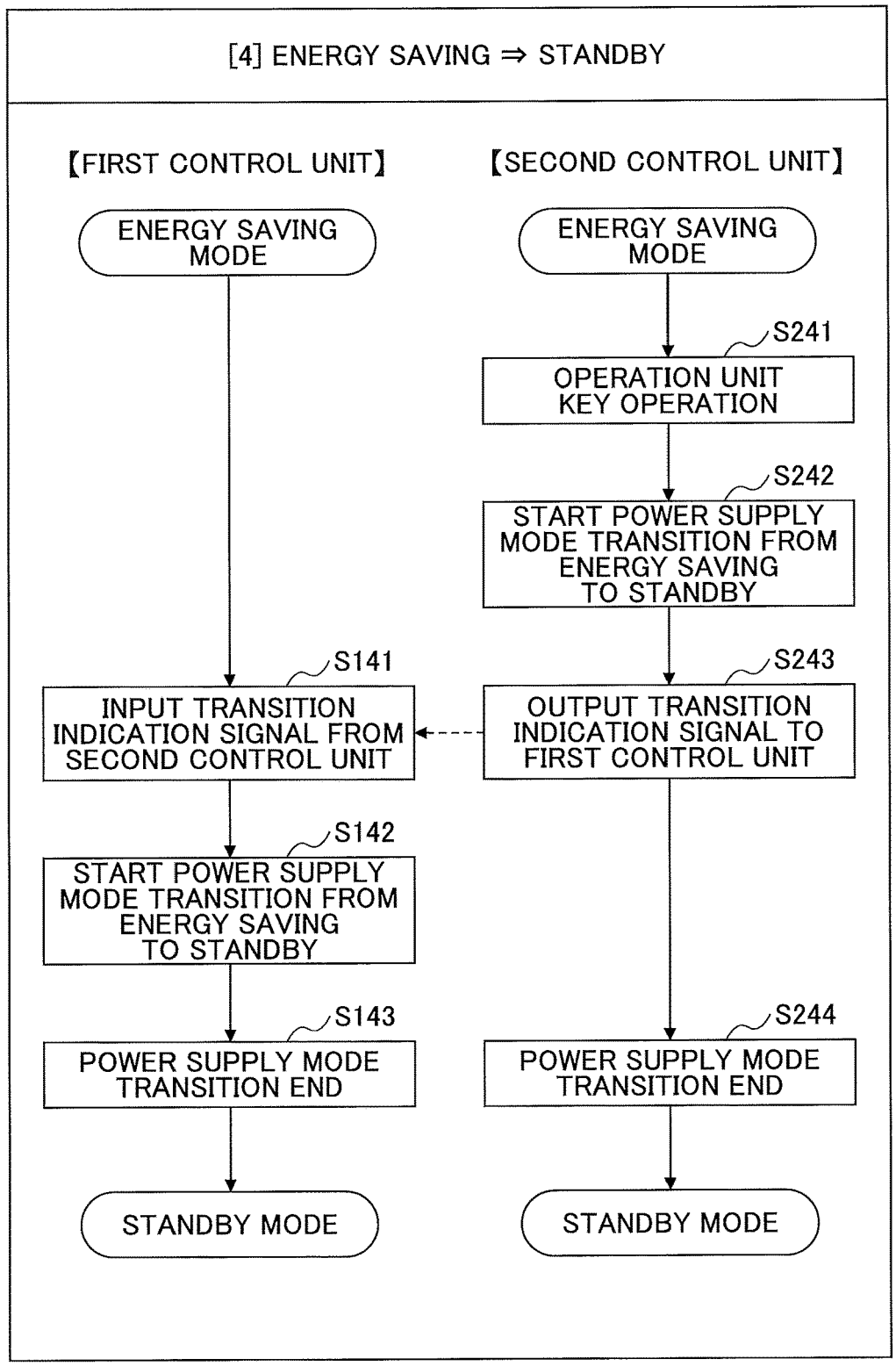
FIG. 9A and FIG. 9B are flowcharts illustrating a transition between an energy saving mode and the standby mode.
Figure 9B:
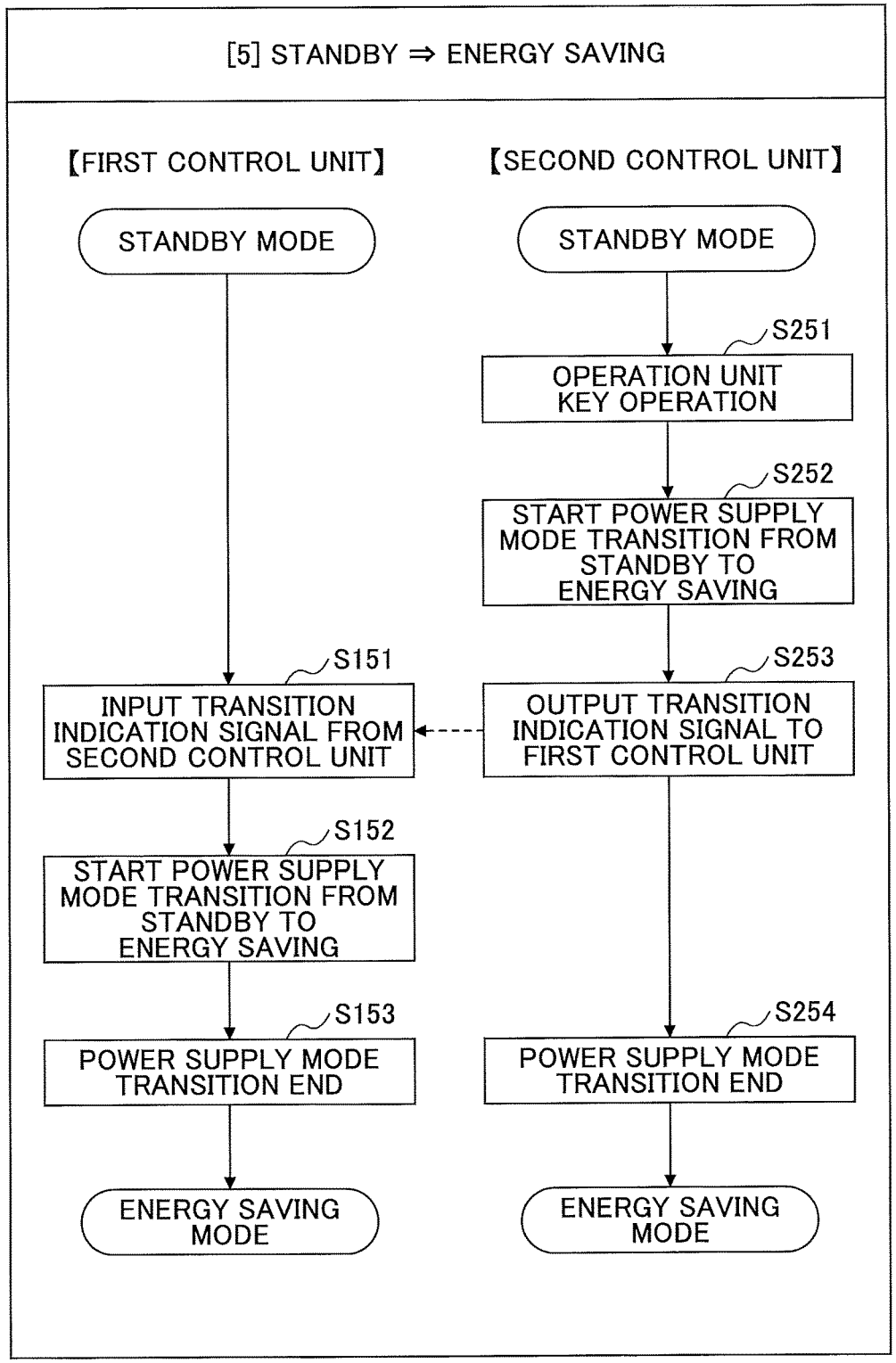

In the following, flows of the power supply mode transition will be described in detail. FIG. 8A and FIG. 8B are flowcharts illustrating transitions between the standby mode and the AC plug-in mode. FIG. 9A and FIG. 9B are flowcharts illustrating transitions between the energy saving mode and the standby mode. It should be noted that the transition between the shutdown mode and the AC plug-in mode is not performed by using a signal, but performed according to whether the AC plug is inserted into the power outlet as the commercial power supply 90. Therefore, the description of the transmission between the shutdown mode and the AC plug-in mode is omitted.

[1] Standby→AC Plug-In, or, Energy Saving→AC Plug-In:

The image forming apparatus 100 is in the standby mode (or the energy saving mode). When the power switch 101 is turned off, the first control unit 11 starts the forced shutdown (S111). The first control unit 11 starts the power supply mode transition from the standby mode to the AC plug-in mode (S112), and outputs an indication signal indicating that the second control unit 21 should transition to the AC plug-in mode (S113). When the indication signal from the first control unit 11 is input to the second control unit 21 (S211), the second control unit 21 starts a power off sequence transitioning from the standby mode (or the energy saving mode) to the AC plug-in mode (S212). Afterwards, the control units 11 and 21 are turned off (S114, S213), the power supply mode transitions end (S115, S214), and the image forming apparatus 100 is in the AC plug-in mode.

[2] AC Plug-In→Standby:

The power line 180 of the image forming apparatus 100 is inserted into the commercial power supply (AC plug) 90. When the power switch 101 is turned on, the first control unit 11 and the second control unit 21 are turned on (S121, S221). Further, the first control unit 11 starts a start-up sequence transitioning from the AC plug-in mode to the standby mode (S122), and outputs an indication signal indicating that the second control unit 21 should transition to the standby mode (S123). When the indication signal from the first control unit 11 is input to the second control unit 21 (S222), the second control unit 21 starts a start-up sequence transitioning from the AC plug-in mode to the standby mode (S223). Afterwards, each of the control units 11 and 21 ends the power supply mode transition (S124, S224), and is in the standby mode.

[4] Energy Saving→Standby:

The image forming apparatus 100 is in the energy saving mode. When the energy saving switch 122, which is included in the operation panel 120 that is controlled by the operation panel control board 20, is pressed down (S241), the second control unit 21 causes the power supply mode to transition from the energy saving mode to the standby mode (S242). Further, the second control unit 21 outputs an indication signal indicating that the first control unit 11 should transition to the standby mode (S243). When the indication signal from the second control unit 21 is input to the first control unit 11 (S141), the first control unit 21 starts a start-up sequence transitioning from the energy saving mode to the standby mode (S142). Afterwards, each of the control units 11 and 21 ends the power supply mode transition (S143, S244), and is in the standby mode.

[5] Standby→Energy Saving:

The image forming apparatus 100 is in the standby mode. When the energy saving switch 122, which is included in the operation panel 120 that is controlled by the operation panel control board 20, is pressed down (S251), the second control unit 21 causes the power supply mode to transition from the standby mode to the energy saving mode (S252).

The second control unit 21 outputs an indication signal indicating that the first control unit 11 should transition to the energy saving mode (S253). When the indication signal from the second control unit 21 is input to the first control unit 11 (S151), the first control unit 21 starts a start-up sequence transitioning from the standby mode to the energy saving mode (S152). Afterwards, each of the control units 11 and 12 ends the power supply mode transition (S153, S254), and is in the standby mode.

It should be noted that there is a setting value also for the transition [3] in the figure of FIG. 7B. However, there is actually only a few cases the transition [3] is performed because, if the image forming apparatus 100 transitions to the energy saving mode immediately after the image forming apparatus 100 is turned on, then the wait time will be increased for a user who wants to use the image forming apparatus 100 immediately.

As described above, in each of the control units of the control boards, the lengths of the change periods of the indication signal (signal logic determination periods) are divided for each of the mode transitions. It is possible to determine the power supply mode transition of the control unit according to the lengths of the change periods. Therefore, it is possible to control the power supply mode transition by using a single terminal.

As described above, in an embodiment, it is possible to reduce cost comparing with the conventional configuration in which two sets of cable connectors and cables are required. Further, because only a single cable is required, the arrangement is easy and the size of the apparatus can be reduced in these days of a smaller operation panel.

<Reset IC>

Figure 10:
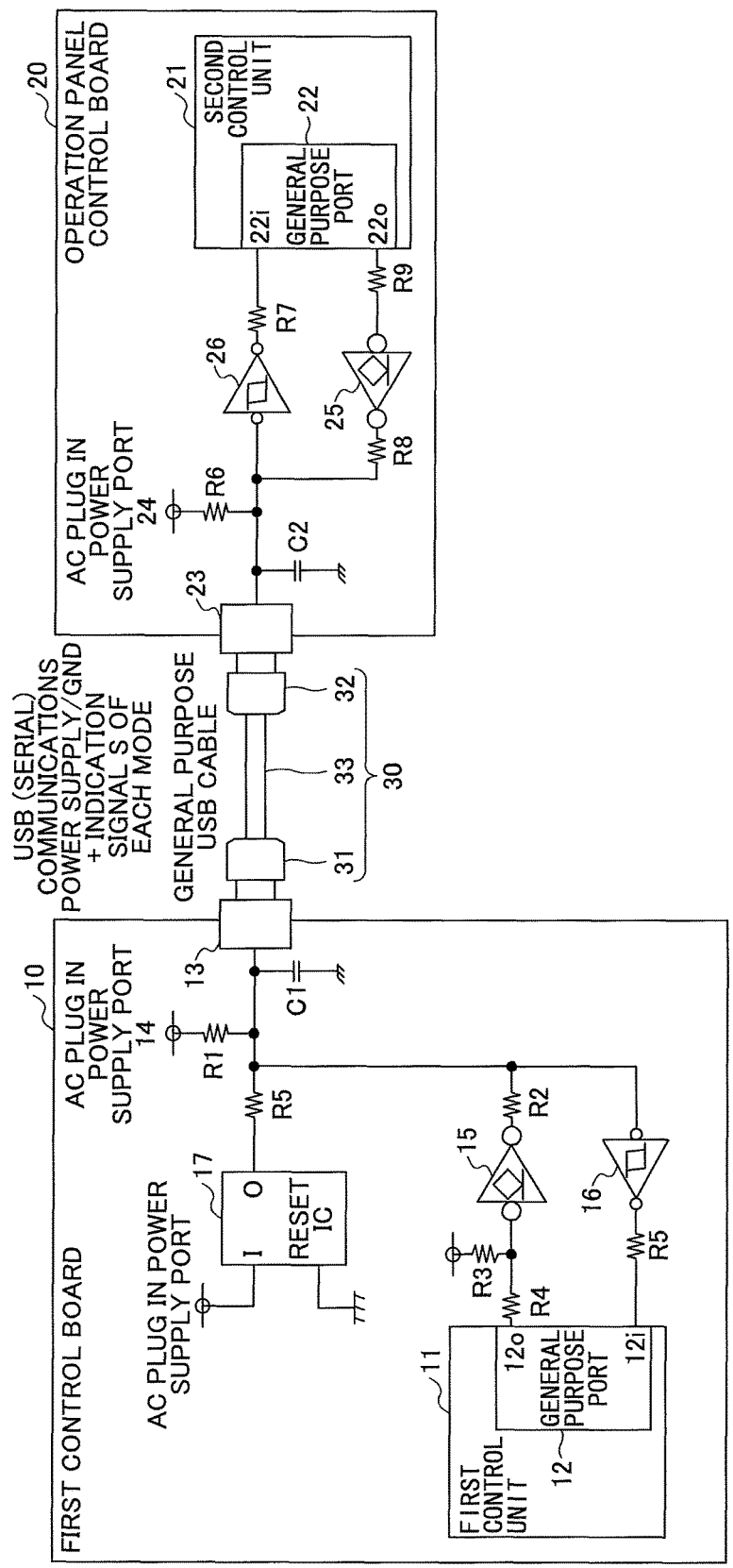
FIG. 10 is a configuration diagram in the case where a reset IC is used.

FIG. 10 is a configuration diagram in the case where a reset IC 17 is used.

In this configuration example, the reset IC 17 connected to the first control unit 11 is included in the first control board 10. Power (AC plug-in power) from the power line is input to the reset IC 17. When the power switch 101 is turned on, the power is transmitted to the reset IC 17.

By having the reset IC 17 connected to a transmission path of the indication signal in the first control board 10, at the time of start-up from the AC plug-in mode (at the time of the apparatus start-up), as illustrated in S113 in FIG. 8A, immediately after the reset, it is possible to cause the second control unit 21 of the operation panel control board 20 to perform the power supply mode transition before the first control unit 11 completes the power supply start-up. As a result, it is possible for the entire image forming apparatus 100 and the operation panel 120 to quickly perform the start-up operation.

<Transition to Dedicated Mode>

Figure 11B:
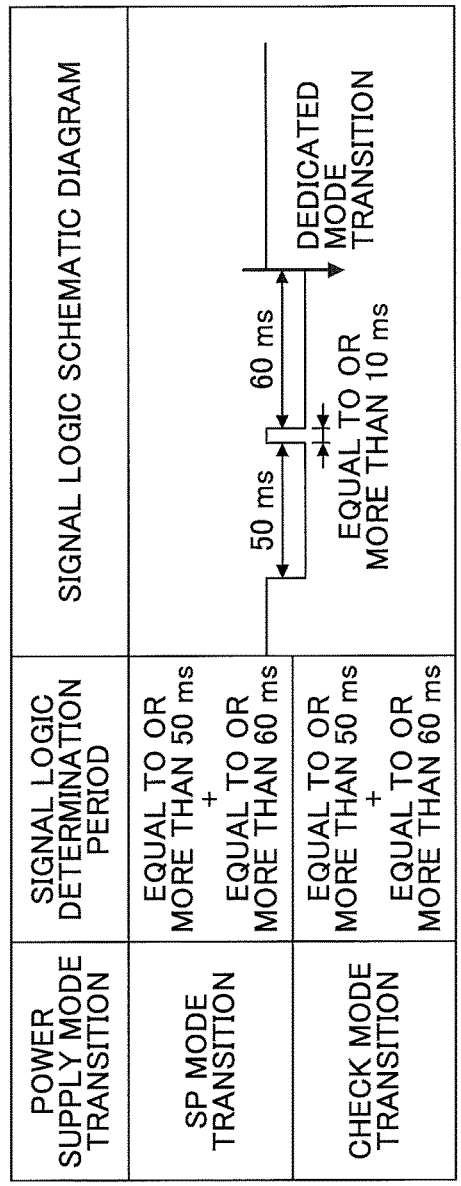
FIG. 11B is a drawing illustrating settings of signal logic determination periods of the power supply modes.
Figure 11A:
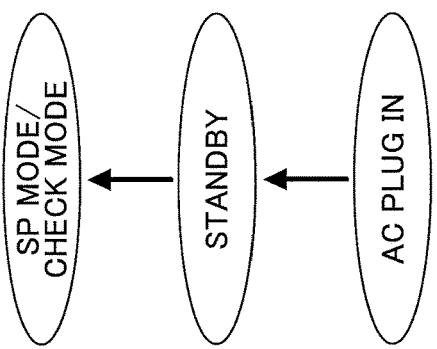
FIG. 11A is a schematic transition diagram illustrating a transition to a dedicated mode.

FIG. 11A is a schematic transition diagram illustrating a transition to a dedicated mode. FIG. 11B is a drawing illustrating settings of signal logic determination periods of the power supply modes.

As illustrated in FIG. 11B, if specific keys are pressed down during the time the image forming apparatus 100 is started-up in response to turning-on of the power switch 101, then, after the logical value of the indication signal is changed for 50 ms, the logical value is returned to an original value for 10 ms or more, and, after that, the logical value is changed for 60 ms or more. In the case where the logical value of the indication signal is changed as described above, the power supply mode is caused to transition from the AC plug-in mode to the dedicated mode via the standby mode.

Similar to the transition [2], in the case where the change period after the logical value of the indication signal is changed is equal to or more than 50 ms, the power supply mode is caused to transition from the AC plug-in mode to the standby mode.

It should be noted that, when detecting the change period of the logical value for the dedicated mode, a period equal to or more than 10 ms and less than, for example, 30 ms is set as a return period to the original logical value because a period less than 10 ms after the logical value of the indication signal is changed is determined to be noise.

Further, in order to detect the change period of the logical value after the return period for transitioning to the dedicated mode, 60 ms with an upper limit value (e.g., 110 ms) is set as the signal logic determination period. In this way, it is possible to avoid being confused with the transition [5] in which the power supply mode is caused to transition from the standby mode to the energy saving mode.

Figure 12:
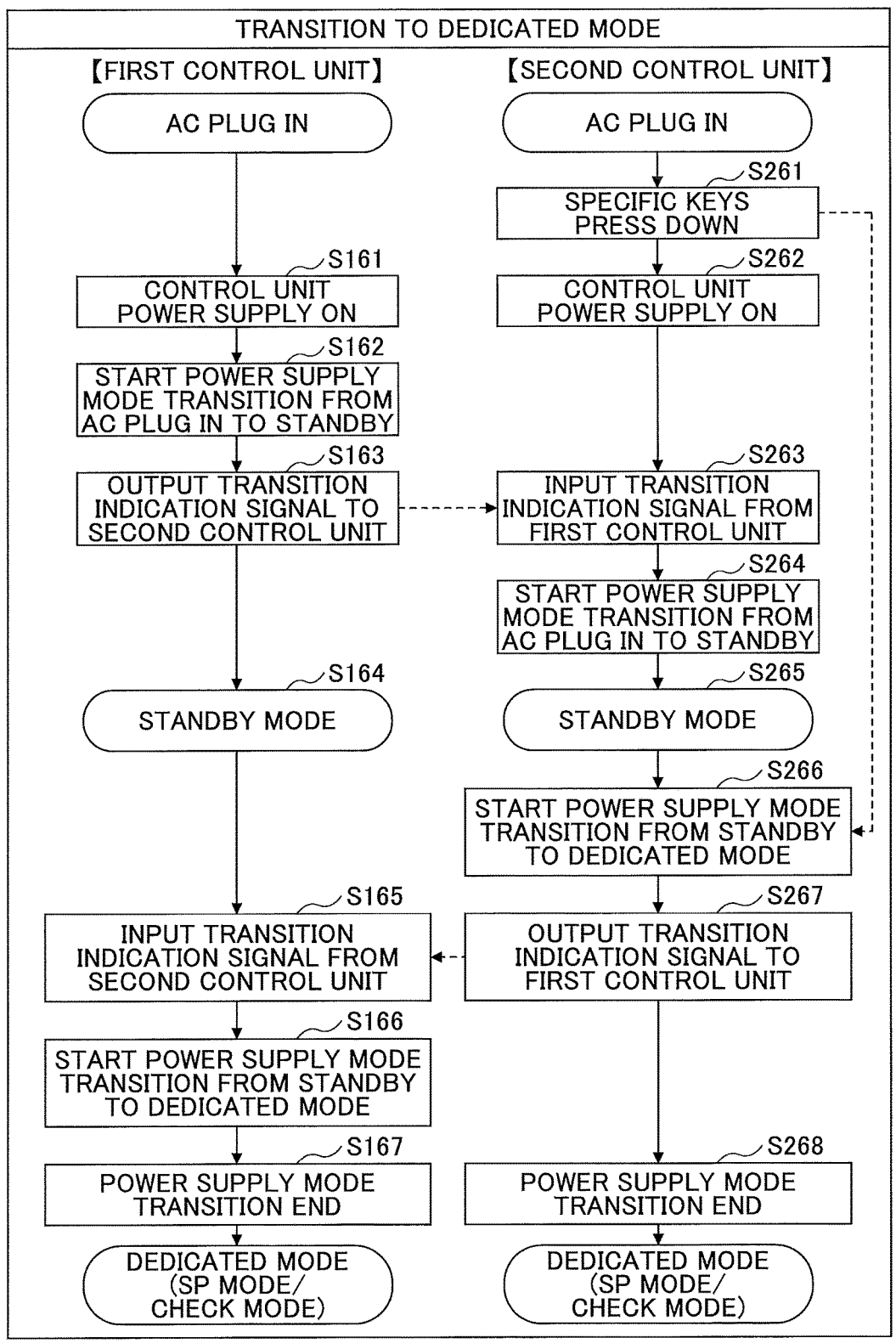
FIG. 12 is a flowchart illustrating a transition to the dedicated mode.

FIG. 12 is a flowchart illustrating a transition to the dedicated mode. In order to cause the image forming apparatus 100 to transition to the dedicated mode, the specific keys of the hardware numeric keys 123 of the operation panel 120 are pressed down at the same time during the time when the image forming apparatus 100 is started up by having the power switch 101 turned on in a state where the power line 180 of the image forming apparatus 100 is inserted in the commercial power supply (AC plug) 90. First, in S261, the second control unit 21 detects that the specific keys are pressed.

Next, similar to the above-described transition [2], the first control unit 11 and the second control unit 21 are turned on (S161, S262). Further, the first control unit 11 starts a start-up sequence transitioning from the AC plug-in mode to the standby mode (S162), and outputs an indication signal indicating that the second control unit 21 should transition to the standby mode (S163).

When the indication signal from the first control unit 11 is input to the second control unit 21 (S263), the second control unit 21 starts a start-up sequence transitioning from the AC plug-in mode to the standby mode (S264). Afterwards, the first control unit 11 and the second control unit 21 are in the standby mode (S164, S265).

As described above, in S261, the second control unit 21 has detected that the specific keys have been pressed down. Therefore, the second control unit 21 transitions from the standby mode to the dedicated mode at the signal logic determination period equal to or more than 10 ms after the indication of transition to the standby mode indicated by the returning-to-H of the logical value of the indication signal (S266).

Further, the second control unit 21 outputs to the first control unit 11 an indication signal indicating that the first control unit 11 should transition to the dedicated mode (S267). When the indication signal from the second control unit 21 is input to the first control unit 11 (S165), the first control unit 11 starts a start-up sequence transitioning from the standby mode to the dedicated mode (S166). Afterwards, each of the control units 11 and 21 ends the power supply mode transition (S167, S268), and is in the dedicated mode.

It should be noted that the second control unit 21 transitions to the dedicated mode only in the case where the specific keys are operated during the power supply start-up (S261). Therefore, a malfunction does not occur even if the specific keys of the hardware numerical keys 123 are pressed down at the same time by mistake when the image forming apparatus 100 is in use.

Here, in the dedicated mode, it may be possible to check internal settings of the image forming apparatus 100, or it may be possible to check individual functions or operations of the functions installed in the image forming apparatus 100. In the dedicated mode, a kind of dedicated operation is available, and the power consumption is similar to that of the standby mode. As a specific example of the dedicated mode, there are a special (SP) mode and a check mode as described below.

In the SP mode (management mode), a power supply state is similar to that of the standby mode, and it is possible for a developer or a customer engineer (administrator, maintenance person) to check or change various settings of applications and software of the image forming apparatus 100.

As described above, usability for a developer and an administrator will be increased by causing the image forming apparatus 100 to transition to the SP mode with a simple operation.

In the check mode, a power supply state is similar to that of the standby mode, and it is possible for a customer engineer (administrator, maintenance person) or a user (customer) to check and obtain the number of printed pages, an error frequency, or a print status of the image forming apparatus 100.

As described above, checking efficiency of the functions of the image forming apparatus 100 by an administrator or a user will be increased by causing the image forming apparatus 100 to transition to the check mode with a simple operation.

As described above, even when the number of the power supply modes (control modes) of the image forming apparatus is increased, it is possible to control the power supply modes without interfering with the serial communications among the control boards by increasing the number of setting values of the signal logic determination periods of the indication signal. Further, another power supply mode may be further defined by setting another signal logic determination period.

<Additional Board>

Figure 13:
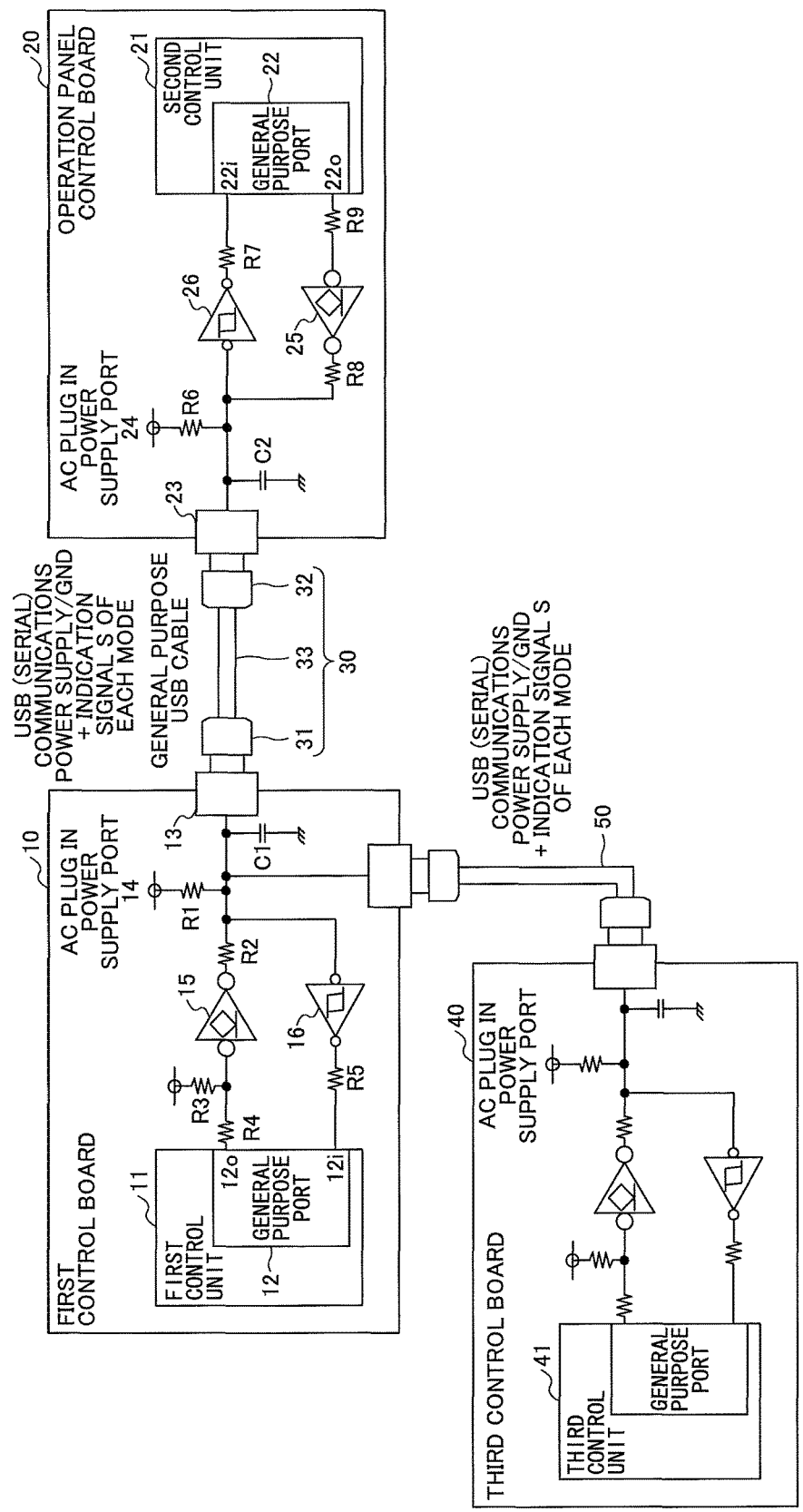
FIG. 13 is a drawing illustrating an overall configuration in the case where three or more boards are connected.
Figure 14:
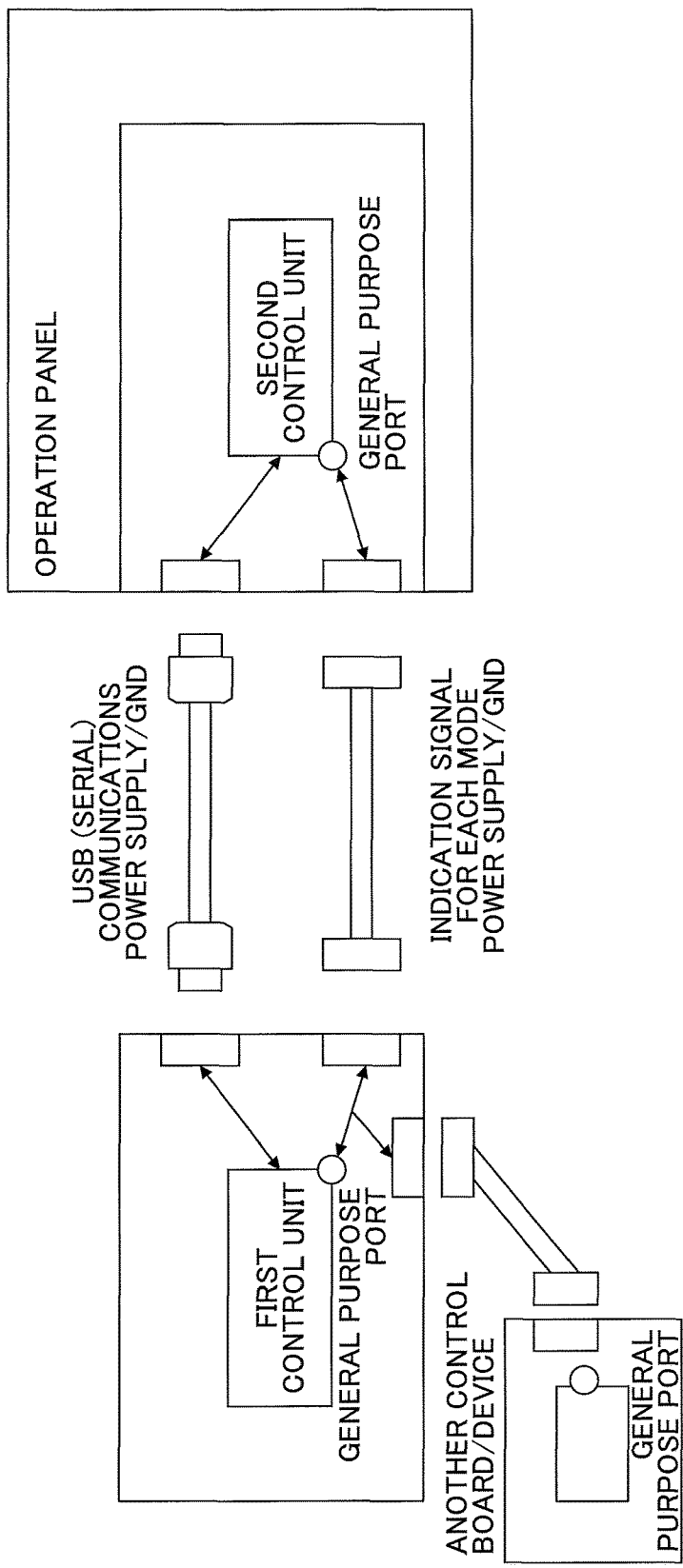
FIG. 14 is a drawing illustrating an overall configuration of a conventional transmission control apparatus.

FIG. 13 is a drawing illustrating an overall configuration in the case where the controlling is performed among three boards.

In this configuration, the indication signal is also transmitted to a third control unit 41 of a third control board 40 by connecting the third control board 40 to the first control board 10 via a second cable 50. In this configuration, the second general purpose cable 50 is used for transmission of the indication signal that controls transitions of the power supply modes, and used for serial communications.

Therefore, it is possible to perform power supply mode transitions common to the first control board 10, the second control board 20, and the third control board 40.

It should be noted that an example of three boards is illustrated in FIG. 13. In the case of four or more boards, it is possible to perform common specific power supply mode transitions by setting the control units and connecting the cables in the same way.

As described above, a single free line of a standard cable such as a USB cable is used as a bidirectional signal line for transmitting a signal indicating power supply mode transitions of control boards, and the line is connected to a general purpose port of a most typical control unit of each of the control boards.

As described above, in order to indicate a plurality of the power supply mode transitions by using a single signal, lengths of change periods of the signal logic value (signal logic determination periods) are associated with the power supply mode transitions and the associated results are set. With the above arrangement, in each of the control units of the control boards, it is possible to determine a power supply mode of the control unit according to the length of the change period of the indication signal and to perform the power supply mode transition. With the above operations, it is possible to indicate a plurality of the power supply mode transitions by using a single signal. Therefore, it is possible to use the single cable for indicating the power supply mode transitions while the cable is also used for serial communications.

Therefore, a transmission control apparatus according to an embodiment of the present invention is provided. It is possible for the transmission control apparatus to control an indication signal controlling a plurality of the transitions among a plurality of the power supply modes together with a signal for serial communications by using a single general purpose cable without interfering with the serial communications among a plurality of boards.

As described above, preferable embodiments of the present disclosure have been described. The present disclosure is not limited to the specific embodiments and various variations and modifications can be made within the scope of the present disclosure described in the claim.

The present application is based on and claims the benefit of priority of Japanese Priority Application No. 2016-047459 filed on Mar. 10, 2016, the entire contents of which are hereby incorporated herein by reference.

What is claimed is:

1. A transmission control apparatus comprising:
a first control board including a first control unit with an input/output port and a first board connector; and a second control board including a second control unit with an input/output port and a second board connector, wherein the first control board is connected to the second control board via a general purpose cable, the general purpose cable is used for transmission of an indication signal as a digital signal and is also used for serial communications, the digital signal being used for controlling a power supply mode transition, wherein the first control unit and the second control unit transition to a specific power mode of three or more power modes according to a change in a logical value indicated by the indication signal and a length of a specific period during which the changed logical value is being indicated by the indication signal, wherein the first control board includes a first storage unit, the second control board includes a second storage unit, and the first storage unit and the second storage unit store information in which the change in the logical value indicated by the indication signal and the lengths of the periods during which the changed logical value is being indicated by the indication signal are associated with transitions among the three or more power modes, and wherein the first control unit and the second control unit transition to the specific power mode in response to detecting an elapse of the specific period after the change in the logical value.

2. The transmission control apparatus according to claim 1, wherein the general purpose cable is a USB cable and includes a first connection plug to be connected to the first board connector, a second connection plug to be connected to the second board connector, and a transmission line, each of the first connection plug and the second connection plug includes five or more pins and is any one of a USB 2.0 standard Mini type, Micro type, USB 3.0 standard Micro type, or USB 3.1 standard, and an identification ID terminal of the first connection plug and the second connection plug is used for transmission of the indication signal for controlling the power supply mode transition.

3. The transmission control apparatus according to claim 1, further comprising one or more third control boards including a third control unit with an input/output port, wherein the first control board and the third control board is connected by a second general purpose cable, wherein the second general purpose cable is used for transmission of the indication signal for controlling the power supply mode transition and for the serial communications, and wherein transitioning to a specific power supply mode is performed, which mode is common to the first control board, the second control board, and the third control board.

4. An image forming apparatus comprising the transmission control apparatus according to claim 1.

5. The image forming apparatus according to claim 4, further comprising a power line configured to supply power by being connected to a commercial power supply, wherein the three or more power supply modes include a standby mode in which a function installed in the image forming apparatus can be immediately executed, an energy saving mode in which power consumption is less than the standby mode and an available function is limited, and a power line plug-in mode in which the power line is connected to the commercial power supply and the main power supply of the image forming apparatus is turned off.

6. The image forming apparatus according to claim 5, wherein an on/off state of the main power supply is input to the first control board and an indication for switching of the energy saving mode is input to the second control board.

7. The image forming apparatus according to claim 6, wherein a reset IC connected to the first control unit is included in the first control board, when transitioning from the power line plug-in mode to a specific power supply mode, the reset IC transmits the indication signal to the second control unit to cause the second control unit to transition to the specific power supply mode before a start-up of the first control unit is completed, which start-up is started in response to turning-on of the main power supply.

8. The image forming apparatus according claim 4, further comprising an operation panel including a plurality of keys, wherein the second control board is an operation panel control board, and, by having a specific plurality of the keys of the operation panel pressed at the same time, the power supply mode set in the image forming apparatus is transitioned to a dedicated mode.

9. The image forming apparatus according to claim 8, wherein the dedicated mode is a management mode in which various settings of an application and software of the image forming apparatus can be checked and modified.

10. The image forming apparatus according to claim 8, wherein the dedicated mode is a check mode in which a specific function of the image forming apparatus can be checked individually.

* * * * *